United States Patent
Arvidsson et al.

(10) Patent No.: US 9,693,374 B2
(45) Date of Patent: Jun. 27, 2017

(54) METHOD AND ARRANGEMENT FOR ADMISSION CONTROL IN A SHARED CHANNEL ENVIRONMENT

(75) Inventors: Pontus Arvidsson, Stockholm (SE); Magnus Hurd, Stockholm (SE); Christian Skärby, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 54 days.

(21) Appl. No.: 14/396,815

(22) PCT Filed: May 16, 2012

(86) PCT No.: PCT/SE2012/050542
§ 371 (c)(1),
(2), (4) Date: Oct. 24, 2014

(87) PCT Pub. No.: WO2013/172754
PCT Pub. Date: Nov. 21, 2013

(65) Prior Publication Data
US 2015/0117344 A1    Apr. 30, 2015

(51) Int. Cl.
*H04W 72/08* (2009.01)
*H04W 76/02* (2009.01)
*H04L 5/00* (2006.01)
*H04W 72/12* (2009.01)
*H04W 28/24* (2009.01)

(52) U.S. Cl.
CPC .......... *H04W 76/02* (2013.01); *H04L 5/0064* (2013.01); *H04W 72/1263* (2013.01); *H04W 76/027* (2013.01); *H04W 28/24* (2013.01)

(58) Field of Classification Search
CPC ............. H04W 76/02; H04W 72/1263; H04W 76/027; H04W 28/24; H04L 5/0064
See application file for complete search history.

(56) References Cited

U.S. PATENT DOCUMENTS

| | | | |
|---|---|---|---|
| 8,971,308 B2* | 3/2015 | Karlsson | H04L 12/5695 370/238 |
| 9,113,405 B2* | 8/2015 | Garcia | H04L 12/5692 |
| 2012/0224536 A1* | 9/2012 | Hahn | H04L 45/00 370/328 |

(Continued)

OTHER PUBLICATIONS

PCT Written Opinion of the International Searching Authority for International application No. PCT/SE2012/050542, Feb. 11, 2013.

(Continued)

*Primary Examiner* — Phuc Tran
(74) *Attorney, Agent, or Firm* — Baker Botts, LLP (57) ABSTRACT

Network node and method therein for admission control in a communication system applying shared channels for communication. The method comprises receiving a request for a bearer setup, and deciding whether to accept or reject the request for a bearer setup based on information on current bearers carrying data having a QoS value, and for which bearers a transmission of the data fulfills a criterion, the criterion representing a probability of violating the QoS value. Information on bearers carrying data which do not have a QoS value and information on bearers for which a transmission of data having a QoS value does not fulfill the criterion is disregarded.

12 Claims, 8 Drawing Sheets

(56) References Cited

U.S. PATENT DOCUMENTS

| | | | |
|---|---|---|---|
| 2013/0053048 A1* | 2/2013 | Garcia | H04L 12/5692 |
| | | | 455/450 |
| 2013/0143574 A1* | 6/2013 | Teyeb | H04W 36/0011 |
| | | | 455/438 |
| 2013/0244672 A1* | 9/2013 | Lin | H04W 76/02 |
| | | | 455/450 |
| 2014/0029536 A1* | 1/2014 | Tian | H04W 28/24 |
| | | | 370/329 |
| 2015/0109910 A1* | 4/2015 | Hurd | H04W 28/0242 |
| | | | 370/230 |

OTHER PUBLICATIONS

"QoS-Aware Single Cell Admission Control for UTRAN LTE Uplink" by M. Anas et al., 2008.
"Combined Admission Control and Scheduling for QoS Differentiation in LTE Uplink" by Mohammad Anas et al., 2008.
3GPP TS 23.203 V11.5.0 $3^{rd}$ Generation Partnership Project; Technical Specification Group Services & System Aspects; Policy and Charging Control Architecture, Release 11 ; 175 pages, Mar. 2012.
3GPP TS 36.413 V10.5.0 $3^{rd}$ Generation Partnership Project; Technical Specification Group Radio Access Network; Evolved Universal Terrestrial Radio Access Network (E-UTRAN); S1 Application Protocol (S1AP) Release 10; 255 pages, Mar. 2012.

* cited by examiner

METHOD AND ARRANGEMENT FOR ADMISSION CONTROL IN A SHARED CHANNEL ENVIRONMENT

PRIORITY

This nonprovisional application is a U.S. National Stage Filing under 35 U.S.C. §371 of International Patent Application Serial No. PCT/SE2012/050542, filed May 16, 2012, and entitled "Method and Arrangement for Admission Control in a Shared Channel Environment."

TECHNICAL FIELD

The suggested technology relates to admission control, especially to admission control in wireless communication systems, such as e.g. EUTRAN, applying shared channels.

BACKGROUND

In wireless communication systems, the task of deciding whether to admit or reject a request for a radio bearer setup is handled by a function denoted Admission Control. The admission control decides whether to accept or reject a request for a radio bearer setup based on the present system load, e.g. in form of usage of certain monitored system resources (MSRs) as well as the type of bearer the request relates to.

Figure 1:
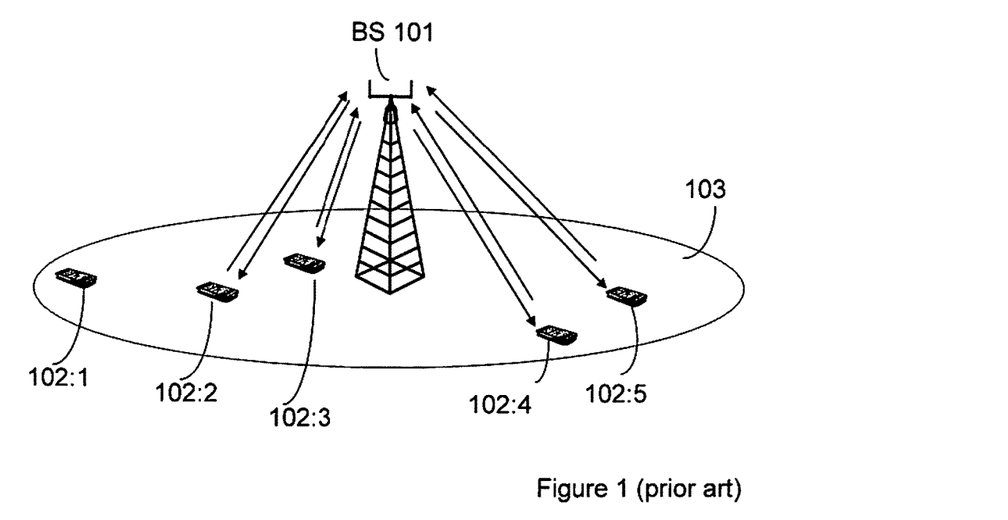
FIG. 1 shows a schematic overview of a base station in a cell in a wireless communication system, according to the prior art.

An example situation is illustrated in FIG. 1, which shows a base station BS 101 in a cell 103 in a wireless communication system. A number of mobile terminals 102:1-102:5 are located in the cell 103. The mobile terminals 102:2-102:5 have ongoing services, for which the BS 101 have set up a number of radio bearers. The services may be of different types. If the user of e.g. the mobile terminal 102:1 wants to start a service, such as a VoIP call, a request is sent from the mobile terminal 102:1 to the base station 101 serving the mobile terminal, requesting resources for the VoIP call. This may be referred to as that the mobile terminal 102:1 sends a request for a bearer setup. The base station receives the request, and evaluates the current load in the cell 103. If it is determined that there are enough resources available for allowing setup of a VoIP call in the cell, the request is accepted, and a radio bearer is set up for the VoIP call. On the other hand, if it is determined that the current load is too high for allowing a VoIP call, the request for resources is rejected.

Such radio bearers are sometimes denoted Radio Access Bearers (RABs), or, in EPS systems, E-RABs. A radio bearer may be regarded as a virtual connection between two endpoints, which provides a transport service. The transport service, and thus the bearer, may be associated with specific QoS attributes. For example, data packets related to a conversational call should preferably not be delayed more than a certain number of ms, for obvious reasons. Thus, a radio bearer set up for a conversational call may be assigned a QoS attribute related to e.g. a guaranteed bitrate and a maximum packet delay.

Different services have different demands on e.g. bit rate and delay. A distinction is made between services with QoS requirements, supported by QoS bearers, and services without any QoS requirements, where services without QoS requirements are referred to as "best effort services". Services with QoS requirements are services such as VoIP that need at least a certain bit rate to function at all. For a best effort service, such as normal FTP traffic, the end user is considered satisfied as long as the bit rate is not zero.

Given that reasonable spectral efficiency is achieved, the scheduler has the task of dividing the available resources between different users and services with the goal of fulfilling the QoS requirements of bearers in the system.

QoS guidelines [1] state that when the QoS demands of a user are in danger of being violated resources shall be assigned according to priority levels. For best-effort services, these guide-lines can be interpreted such that best-effort are not prioritized at all, since it lacks a strict QoS requirement, or alternatively has a low priority level compared to QoS bearers.

The relation between Admission Control and QoS is that Admission Control can limit the amount of traffic in order to protect the service of existing QoS bearers, with strict QoS requirements, by introducing a threshold for the MSRs, such that QoS contracts of admitted users shall be broken only infrequently. The reasoning behind such thresholds is that if usage with respect to a certain MSR approaches its max capacity, the probability of not finding resources to fulfill QoS contracts increases. The difference between the actual usage of an MSR and the max capacity of said MSR represents a headroom that can absorb fluctuations like incoming mobility, intra-cell mobility and varying radio conditions. Therefore, a threshold for admission control will create this headroom and it can be configured in accordance to what fluctuations are expected for the deployment. A side-effect is that the threshold can also be used to set aside resources for best-effort traffic.

Figure 2:
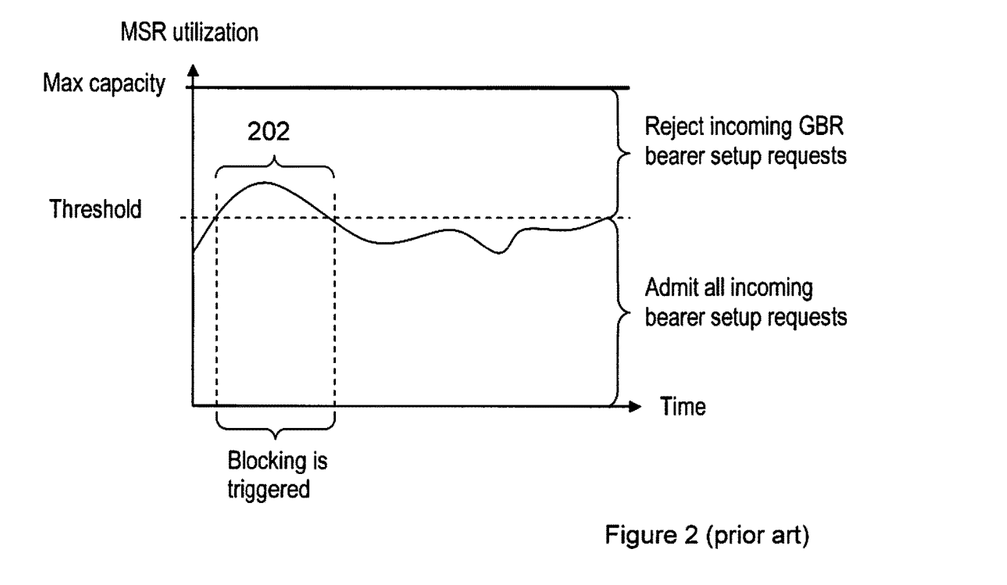
FIG. 2 is a schematic overview on how load on an MSR (Monitored System Resource) may trigger blocking in admission control.

An illustration on how Admission Control compares the load to the threshold is given in FIG. 2. The main purpose of admission control is to disallow excessive load on resources maintained by scheduling, such that users already admitted in the system may be kept satisfied. High load is identified by monitoring the usage of certain monitored system resources. FIG. 2 shows how blocking may be triggered in admission control, i.e. how requests for GBR (Guaranteed Bit Rate) bearer setup are rejected during the period 202, when the usage of a certain system resource exceeds a threshold.

In LTE systems, shared channels are used, as opposed to dedicated channels used in many other communication standards. When applying shared channels, a number of users and/or services compete for the same resources. These resources include e.g. physical resource blocks (PRBs) on Physical Downlink Shared Channel/Physical Uplink Shared Channel (PDSCH/PUSCH) and control channel elements (CCEs) on the Physical Downlink Control Channel (PD-CCH). There is a dynamic aspect of these resources in the sense that the consumption, e.g. by one E-RAB, of these resources can vary from one TTI to another.

The inventors have identified problems associated with Admission Control in systems applying shared channels, which problems will be further described below. It is identified as a difficult but important task for Admission Control to make appropriate admission decisions in shared channel systems, such as LTE.

SUMMARY

It would be desirable to improve admission decisions in shared channel systems, such as LTE, such that inadequate rejections of bearer setup requests are reduced or avoided. It is an object of the technology suggested herein to improve admission decisions in shared channel systems.

The main advantage of the solution described herein is that it increases the accuracy of the admit/reject decisions taken by admission control. More accurate admission control decisions will minimize the cost in terms of system capacity for protecting the QoS requirements of bearers, which are already set up in the system.

Further, in a preferred embodiment, a congestion metric is used for admission control, which metric is also used by a scheduler. Not only will this decrease the complexity, in terms of implementation, as no new measurements need to be added, but this will ensure co-operation between scheduling and admission control.

According to a first aspect a method is provided in a network node in a communication system applying shared channels for communication. The method comprises receiving a request for a bearer setup, and deciding whether to accept or reject the request for a bearer setup based on information on current bearers carrying data having a QoS value, and for which bearers a transmission of the data fulfills a criterion. The criterion may be regarded as representing a probability of violating the QoS value. The method further involves, actively or passively, disregarding information on bearers carrying data which do not have a QoS value and information on bearers for which a transmission of data having a QoS value does not fulfill the criterion.

According to a second aspect a network node is provided, which is operable in a communication system applying shared channels for communication. The network node comprises a receiver, which is adapted to receive a request for bearer setup. The network node further comprises an admission controller (900), which is adapted to decide whether to accept or reject the request, based on information on current bearers carrying data having a QoS value, and for which bearers a transmission of the data fulfills a criterion representing a probability of violating the QoS value. Thus, information on bearers carrying data which do not have a QoS value and information on bearers for which a transmission of data having a QoS value does not fulfill the criterion is disregarded, and not used for deciding whether to accept or reject the request.

The above method and network node may be implemented in different embodiments. The information on the bearers may be related to resource usage of the bearers. The criterion mentioned above may relate to at least one of: a packet delay, a bit rate; a function of a packet delay and/or a bit rate, and a scheduling priority or weight. In a preferred embodiment, the criterion relates to a scheduling priority or weight, which is set by a scheduler. The scheduling priority or weight may be set as a function of a probability of violating the QoS value. Further, the outcome of the deciding may be indicated to the requesting node.

The embodiments above have mainly been described in terms of a method. However, the description above is also intended to embrace embodiments of the arrangement, adapted to enable the performance of the above described features. The different features of the exemplary embodiments above may be combined in different ways according to need, requirements or preference.

BRIEF DESCRIPTION OF THE DRAWINGS

The suggested technology will now be described in more detail by means of exemplifying embodiments and with reference to the accompanying drawings, in which.

DETAILED DESCRIPTION

The inventors have identified that the usage of some MSRs may be high also in scenarios where the load is low or moderate, i.e. in non-congestion scenarios. That is, it has been identified that there may be other reasons for high resource utilization than high load. Since current methods for Admission Control admits or rejects requests for bearer setup based on load, this identified fact implies that the Admission Control algorithm may reject bearer requests also in situations where there is no reason to do so. Thus, it has been concluded by the inventors that a resource utilization measure, such as "used resources as a percentage of the maximum capacity of the resource" is not a good resource metric for admission control decisions.

Instead, the metric should be straight forward to understand in the sense that: when the metric presents a high value for a resource, it shall indicate congestion for the resource. Spending the resource in a different manner should not decrease the value of the metric. When the metric presents a low value it shall mean the resource is not congested. Such a metric is presented further below in this disclosure.

Below, the identified problems with the resource utilization measures, which are currently used for admission control, will be further described.

One identified example of when a straight-forward use of a resource utilization measure as base for Admission Control becomes problematic is when delay scheduled services, such as VoIP, are scheduled prior to their bundling time in low load scenarios. This means that the packages will be scheduled and transmitted as soon as they arrive, as opposed to in a high load situation where a number of packages, i.e. more than one, will have accumulated in the buffer before transmission due to less frequent scheduling of the bearer, and thus be bundled and transmitted together.

Consequently, in such a low-load case, the utilization of per-transmission kind of resources, such as CCE resources, due to VoIP traffic, will be high due to that more transmissions are being used to transfer the same amount of data, as compared to the high-load case. That is, each transmission comes with a certain cost in terms of CCEs, irrespective of the number of VoIP packets comprised in the transmission. In other words, the high load on CCE resources appears since the CCE resources are poorly spent, i.e. are spent on sending small packets instead of using the allowed delay budget to collect larger packets for transmission. However, as the load is low, no other services will be at risk of starvation due to this increased resource usage. Performing Admission Control without considering this aspect of, for example, the CCE resource will, however, result in rejection of any new requests for e.g. GBR radio bearer setup, based on the high usage of CCE resources, and thus vastly decrease the capacity of the system.

Thus, it has been identified by the inventors that for services such as VoIP, Admission Control lacks the knowledge of how much resources that will actually be used by each user/service/bearer in a congestion scenario. This prevents admission control from taking accurate decisions.

Accordingly, it has further been identified by the inventors, that in a similar fashion, for more rate hungry services, such as TCP (Transmission Control Protocol), Admission Control lacks knowledge of how much resources that are required to only just fulfill the QoS requirements of the service, and not more. As these rate hungry services generally use as much resources as they can, there may be very high resource utilization without other services being at risk of starvation. This may also lead to inadequate rejections of bearer setup request and thereby greatly reduced capacity.

The identified problem of inadequate rejections described above may be tackled by the herein suggested solution, which involves introduction of congestion awareness in the Admission Control algorithm. The congestion awareness involves determining, prior to making a decision to reject a radio bearer setup request, whether a high resource usage is caused by congestion, due to high load, or not.

Herein, it is suggested that only the resource usage which is related to already admitted/existing radio bearers, for which the QoS requirement is at risk, should be considered by the Admission Control when determining whether to accept or reject a request for a radio bearer setup.

Thus, it is suggested that resource usage when there is no congestion within the system should be disregarded, even when it is high. Disregarding information of non-congestion resource usage will efficiently prevent Admission Control from unnecessarily rejecting requests when the system load is low in terms of admitted number of bearers but high in terms of used resources.

It has been identified by the inventors, that by using the same congestion metric as used by the scheduler when identifying congestion it is ensured that the admission control algorithm will co-operate with the scheduler according to QoS guidelines. The scheduling priority or scheduling weight is a preferred congestion metric, since this is a general measure suitable for all types of scheduling of QoS services, and since this measure could be provided from a scheduler. Other possible congestion metrics, for certain types of QoS traffic/scheduling, could be e.g. a packet delay measure or a bit rate measure. For example, a packet delay measure could be used for DBS, and a bit rate measure could be used for rate scheduling. The congestion metric could be a function of e.g. a packet delay or a bit rate, which function is not identical, but similar, to the one used for calculating scheduling priority or weight. Such a function could be used e.g. when certain information is not available from the scheduler or it for some reason is preferred not to use certain information from the scheduler.

One reason for that the scheduling priority is identified as a suitable congestion metric is that it is only in the congestion domain, when QoS requirements are endangered, that the scheduler assigns high priority to a bearer. The suggested solution may e.g. be implemented by configuring a scheduler to report only the resource usage associated with bearers in the congestion domain, i.e. bearers which are subjected to a certain amount of congestion. The reported resource usage may then be used as basis for admission control.

This solution described herein allows admission control to make a distinction between resource use in a congestion scenario and resource use in a non-congestion scenario. This may be achieved by that admission control is supported by the scheduler. The scheduler maintains the QoS requirements of the QoS bearers and concludes there is congestion whenever a QoS requirement for a QoS bearer is endangered. This makes it possible to configure the scheduler to report resource usage at congestion only.

Resource usage in what may be referred to as the non-congestion domain does not indicate that the system capacity is close to its limit. Therefore, which has been identified by the inventors, resource usage in the non-congestion domain, including resources that are not spent optimally, should be disregarded by the Admission Control function, in order for this function to make adequate decisions.

Figure 6:
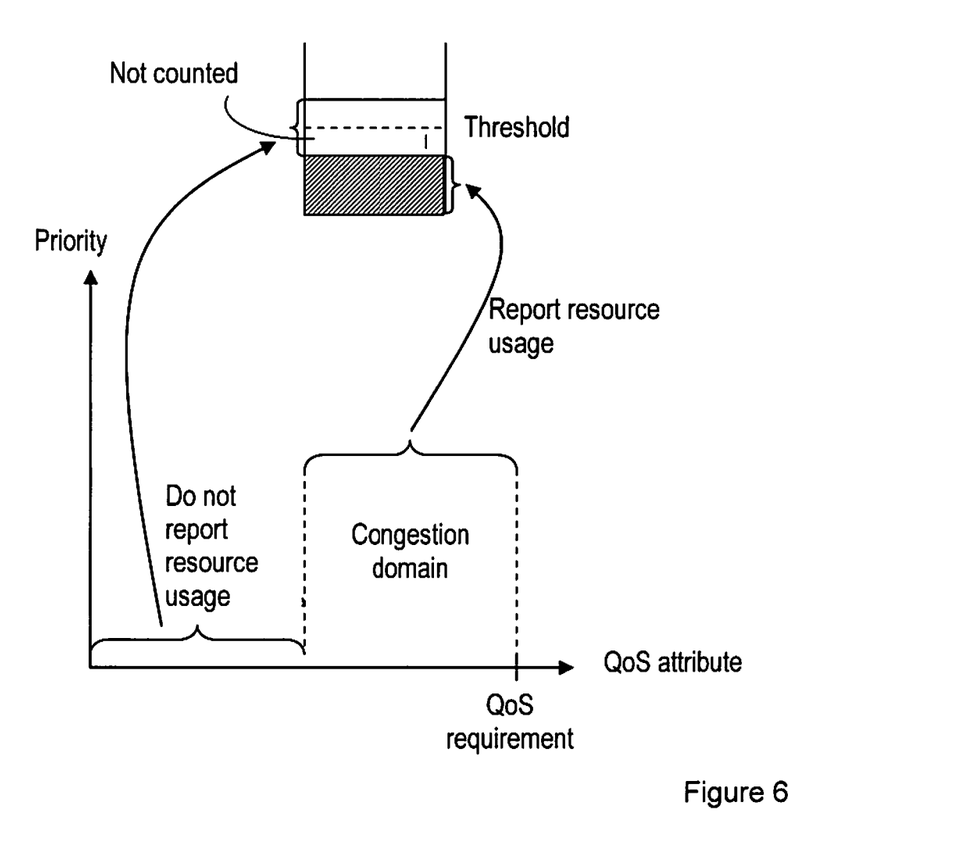
FIG. 6 shows a schematic view of resource usage reporting according to an embodiment. Admission control is more accurate when spent resources are counted at congestion only. Note that if the contribution labeled "Not counted" is included, the utilization exceeds the threshold with pointless rejects as a result.

Ignoring of non-congestion resource usage means that the admit/reject decisions can be made with higher accuracy. This is illustrated in FIG. 6. The QoS referred to in FIG. 6 can relate to any QoS attribute describing a QoS requirement. In the figure, the resource usage at non-congestion is illustrated; if this is included, the utilization exceeds the threshold resulting in admission rejects. However, the utilization at non-congestion represents resources that can be spent in a more efficient way, and therefore such information could lead to inadequate rejections of requests for bearer setup.

As an example for VoIP, the scheduler uses scheduling weights to prioritize among users that need to be scheduled. In the case of delay based scheduling, the scheduling weight is calculated from the age of the oldest packet waiting in a transmission buffer. This will, in turn, lead to that in a congestion scenario, where many users compete for resources and the packet delays increase, the weights of the users when they are scheduled will be a lot higher than when there is no congestion. This implies, as identified by the inventors, that the scheduling weights may be used as an indicator of whether there is congestion within the system or not.

For services using delay based scheduling (DBS), such as VoIP, the problem is that at low load each packet will be transmitted very soon after it arrives in the buffer. This means that very small amounts of data are sent with each transmission and the load on per-transmission resources, e.g. CCEs, will be non-representative of the actual load situation.

Thus, for the case with delay based scheduling, a threshold may set at a level where it is ensured that enough time has passed for there to be more than one packet accumulated in the buffer. This way the resource usage is reported only when the resources are being efficiently utilized and prioritized higher than the best effort services that may be at risk of starvation.

Figure 3:
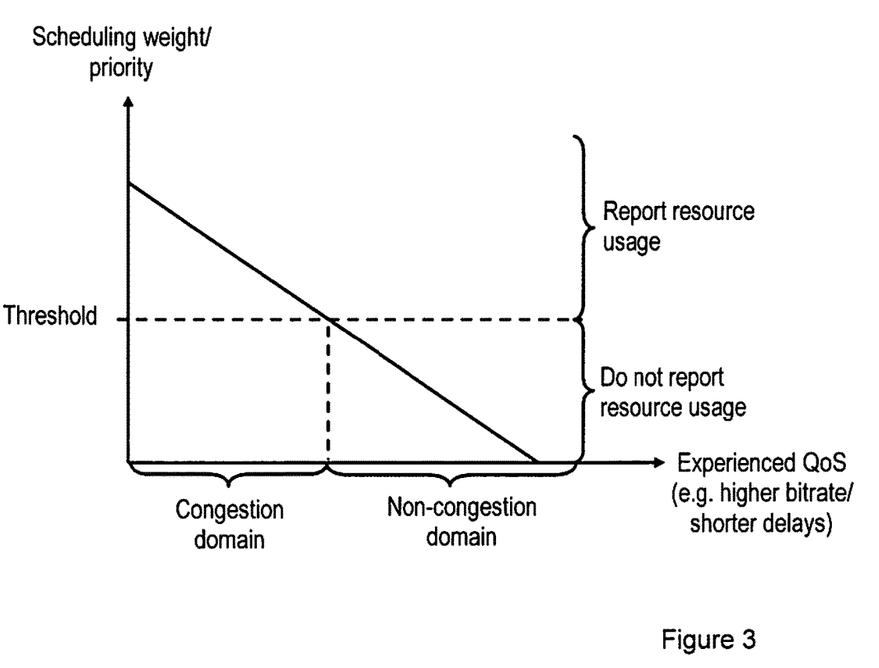
FIG. 3 shows an exemplifying scheduling weight criterion in form of a threshold, for use e.g. with DBS (Delay Based Scheduling) or with Proportional Fair with minimum rate.

For rate scheduling, such as Proportional Fair with minimum rate, a similar problem may arise for rate hungry services with a guaranteed bit rate (GBR) such video. In this case, when the load in the system is low, the GBR-service may use more resources to, for instance, fill the buffer or enable a user to watch the video at a higher resolution in the case of adaptive bit rate video. This special case of increased load, mainly on resources such as PRBs, does not indicate that the system has difficulty maintaining GBR services and should thus not be used as basis for admission control. FIG. 3 shows how the threshold may be implemented for delay based scheduling or for a GBR service.

Figure 4:
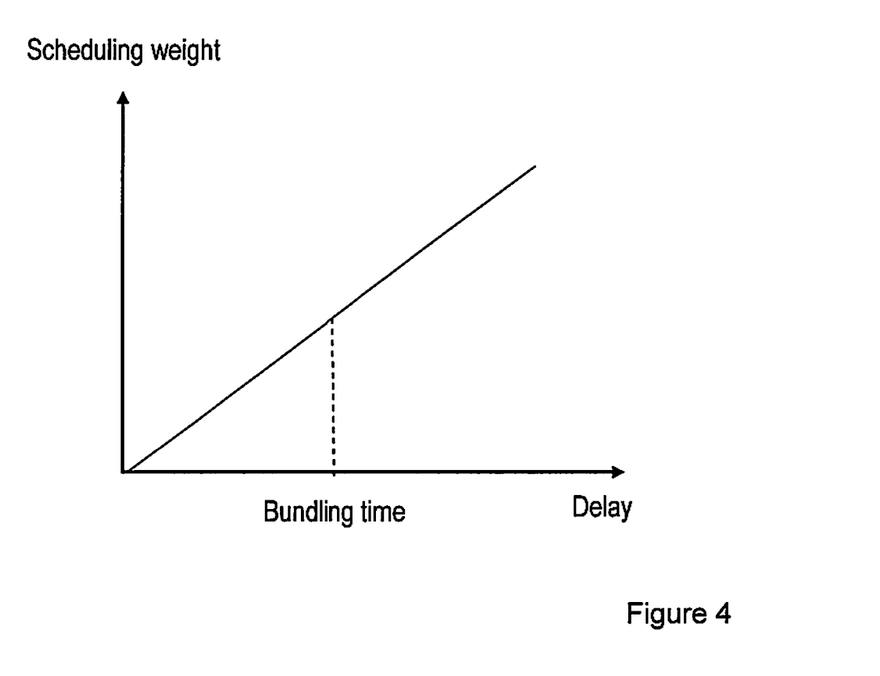
FIG. 4 shows a DBS scheduling weight function and an indication of the bundling time.
Figure 5:
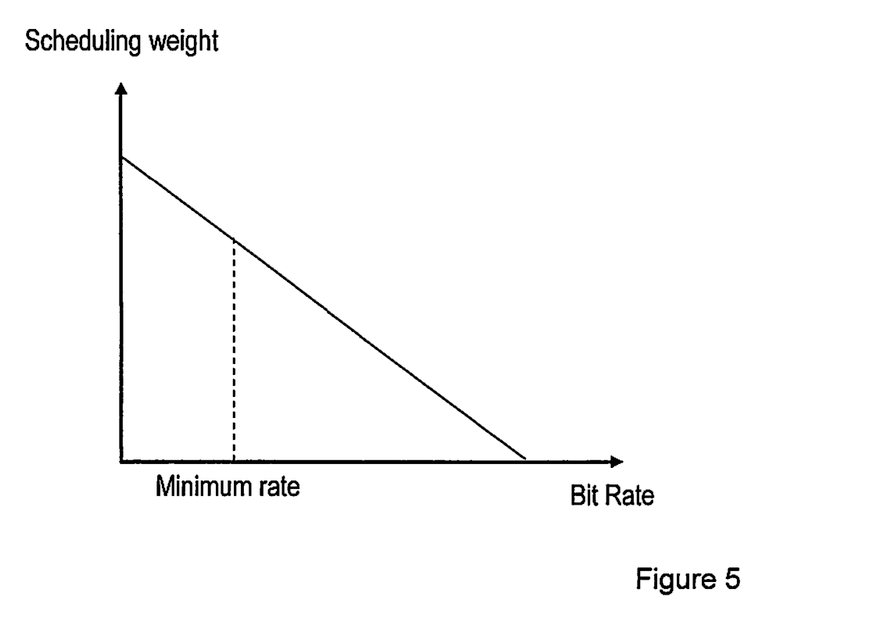
FIG. 5 shows a scheduling weight function for Proportional Fair with minimum rate, and an indication of the minimum bit rate.

FIG. 4 and FIG. 5 show schematic examples of scheduling weight functions for the two aforementioned scheduling strategies, bundling time and minimum rate are highlighted to indicate that the position of the weight reporting threshold directly relates to a specific point in the QoS requirement domain for both strategies.

Figure 7:
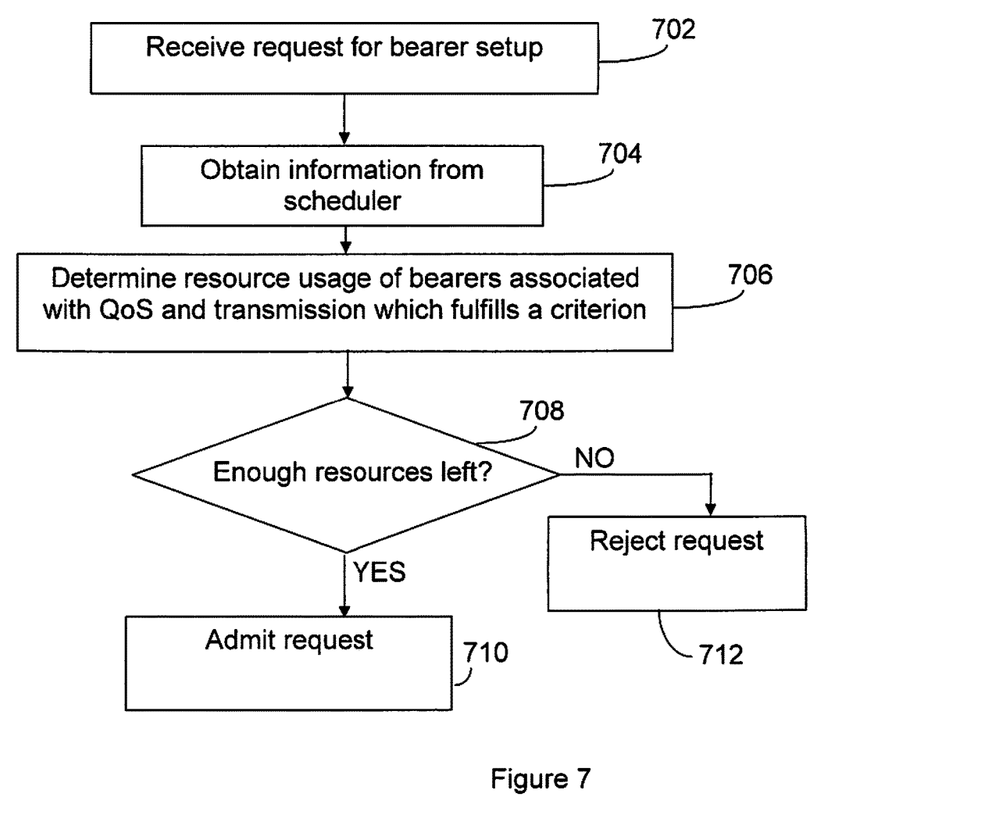
FIGS. 7-8 are flow charts illustrating procedures, according to exemplifying embodiments.

Exemplifying Procedure, FIG. 7

Below, an exemplifying embodiment of the procedure for admission control in a communication system applying shared channels for communication will be described with reference to FIG. 7. The procedure is assumed to be performed in a network node receiving requests for bearer setup, such as a base station, e.g. an eNB, or similar. The network node is assumed to be associated with a number of current bearers, which are already set up, i.e. existing.

A request for a bearer setup is received in an action 702. The request is sent by a requesting node, such as a mobile terminal, which is about to initiate a service requiring a certain QoS, such as e.g. VoIP. In order to determine whether to accept or reject the request, information on the current load situation is needed. This is illustrated as obtaining information from a scheduler in an action 704. For example, the scheduler may be configured to report only such load information that is related to the congestion-domain, i.e. related to bearers which are subjected to congestion. Alternatively, the scheduler may report load information for all bearers, together with an indicator e.g. of the scheduling priority for each bearer. Based on this information, the information belonging to the congestion domain may be identified and used for admission control decisions.

The information which is to be obtained from the scheduler is related to those of the current bearers carrying data having a QoS value, and for which bearers a transmission of the data fulfills a criterion representing a probability of violating the QoS value. That is, the bearers of interest are the bearers which are related to a service, which require a certain QoS in order to function, such as e.g. VoIP or streaming of media for immediate consumption; and which bearers are subjected to a certain amount of congestion, thus assuring that resources are spent in an efficient manner. The total load or resource usage of the current bearers which fulfill the criteria above are determined in an action 706.

Regarding the criterion, which is to be fulfilled, this may relate e.g. to a packet delay, a bit rate or, which is a more general solution, a scheduling priority or weight, or a similar function of packet delay, bit rate or other QoS attribute. Accordingly, this would also be applicable for other QoS-related scheduling metrics. That is, when the criterion is fulfilled, this is an indication of that the bearer is subjected to a certain amount of congestion. This may also be expressed as that the criterion represents a probability of violating the QoS value. For example, when the oldest packet in a buffer to be transmitted on a bearer exceeds a maximum-delay-threshold; when the bit rate on a bearer goes below a minimum-bit rate-threshold; or, when the scheduling priority or weight of a bearer exceeds a threshold, it may be concluded that a probability of violating the QoS value has increased to; approaches, or goes beyond what is acceptable in order to maintain service, and that the resource usage of said bearer should be taken into consideration for admission control decisions.

Information on the load/resource usage of bearers carrying data which do not have a QoS requirement or value in the sense described herein should not be considered as base for admission control decisions. Such information is to be disregarded, e.g. not reported from a scheduler or discarded by the admission control function. Further, information on the load/resource usage of bearers carrying data which has a QoS requirement or value in the sense described herein, but for which bearers a transmission of data does not fulfill the criterion is also to be disregarded for reasons earlier described.

When having determined the total resource usage associated with the bearers subjected to a certain amount of congestion in action 706, it is determined in an action 708, whether there are enough resources left to admit setup of a new bearer in accordance with the request. If it is determined that there is enough resources left, the request is admitted in an action 710. If not, the request is rejected in an action 712.

Figure 8:
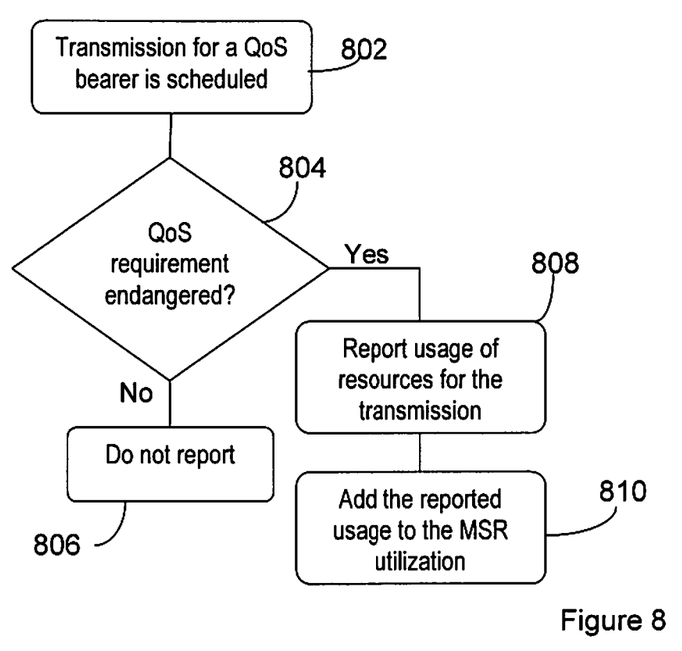

Exemplifying Procedure in Scheduler, FIG. 8

FIG. 8 illustrates an implementation where a scheduler is configured to only report resource usage associated with bearers for which the QoS requirement is endangered, based e.g. on the age of packets in a buffer or a bit rate or a function thereof, as previously described. In this case, all information that is reported to the admission control function should be considered in admission control decisions. A transmission for a bearer carrying data having a QoS requirement or value is scheduled in an action 802. Further, it is determined in an action 804 whether the QoS requirement is endangered. If the QoS requirement is endangered, the resource usage associated with the transmission is reported to an admission control function in an action 808. The accumulated resource usage of the bearers for which the QoS requirements are endangered should be used as base for admission control decisions. This is illustrated as action 810 in FIG. 8, and represents action 706 in FIG. 7.

Figure 9:
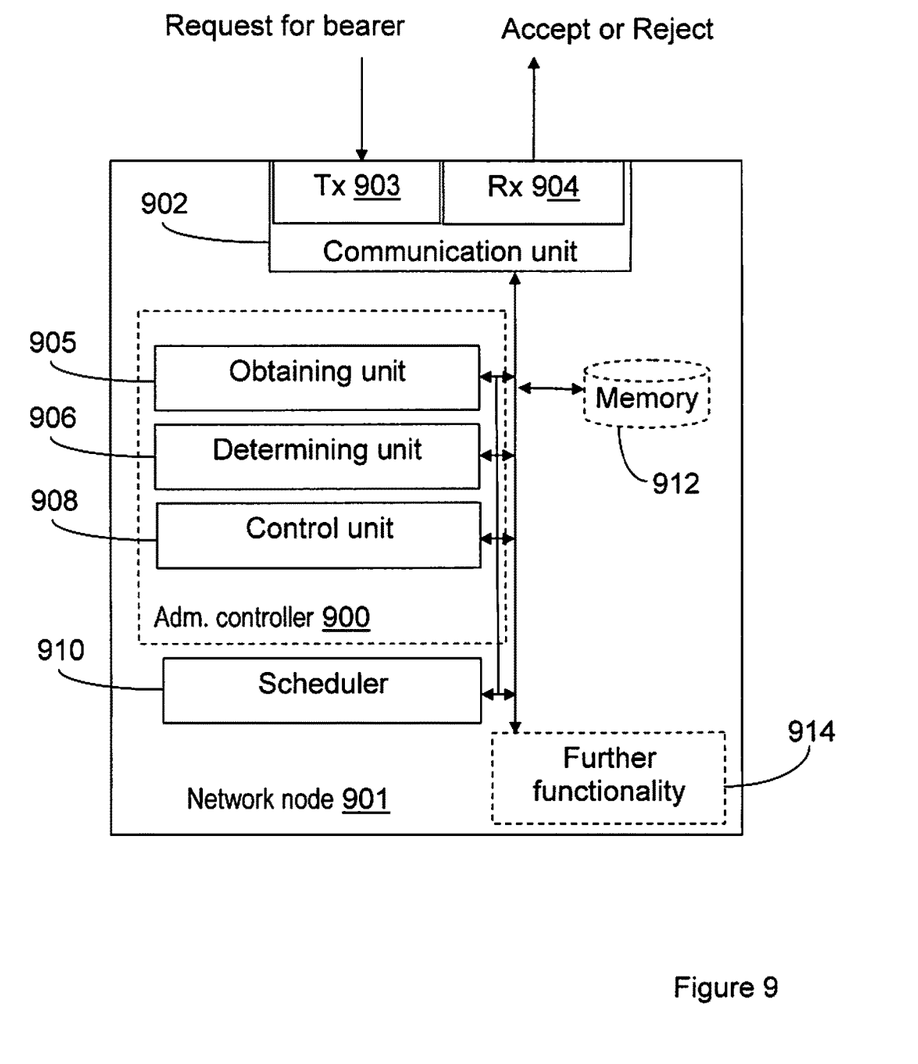
FIGS. 9 and 10 are block charts illustrating arrangements according to exemplifying embodiments.

Exemplifying Arrangement, FIG. 9

Below, an example arrangement in a network node 901 adapted to enable the performance of the above described procedure will be described with reference to FIG. 9. The network node is operable in a communication system applying shared channels for communication. The network node could be a base station, such as an eNB or similar. The network node 901 is illustrated as to communicate with other entities via a communication unit 902, comprising a receiver 904 and a transmitter 903. The network node may comprise functional units 914, such as e.g. functional units providing regular eNB functions, and may further comprise one or more storage units 912.

The arrangement or network node, or parts thereof, could be implemented e.g. by one or more of: a processor or a micro processor and adequate software and memory for storing thereof, a Programmable Logic Device (PLD) or other electronic component(s) or processing circuitry configured to perform the actions described above.

The network node comprises a receiver, which is adapted to receive a request for a bearer setup from a requesting network node. The network node further comprises an admission controller 900, adapted to decide whether to accept or reject the request based on current bearers carrying data having a QoS value, and for which bearers a transmission of the data fulfills a criterion representing a probability of violating the QoS value. The admission controller should not base admission control decisions on information on bearers carrying data which do not have a QoS value and information on bearers for which a transmission of data having a QoS value does not fulfill the criterion. For example, the admission controller could be adapted to disregard such information e.g. if such information is provided by a scheduler.

The admission controller could be illustrated and described as comprising an obtaining unit 905 for obtaining or receiving the request for a bearer setup, or an indication thereof, from the receiver 904 and communication unit 902. The admission controller could further comprise a determining unit 906, adapted to determine or decide whether to accept or reject the request for a bearer setup based on information on current bearers carrying data having a QoS value, and for which bearers a transmission of the data fulfills a criterion representing a probability of violating the QoS value. The criterion to be fulfilled could be related to a packet delay, a bit rate or a scheduling priority or weight, or a similar function, of the bearers. The information on these bearers could be related to the resource usage of said bearers. The information on these bearers could be retrieved or received from a scheduler 910, which is adapted to provide, e.g. only, the relevant information or to provide information e.g. on all bearers or a group of bearers together with information associated with the criterion, such as a packet delay, a bit rate or a scheduling priority or weight. The information associated with the criterion enables the admission controller to identify which bearers that are associated with a transmission that fulfills the criterion.

The admission controller 900 could further be described as comprising a control unit, adapted to accept or reject the request for a bearer setup. For example, a response message indicating that the request is rejected or accepted could be provided to the requesting network node.

Figure 10:
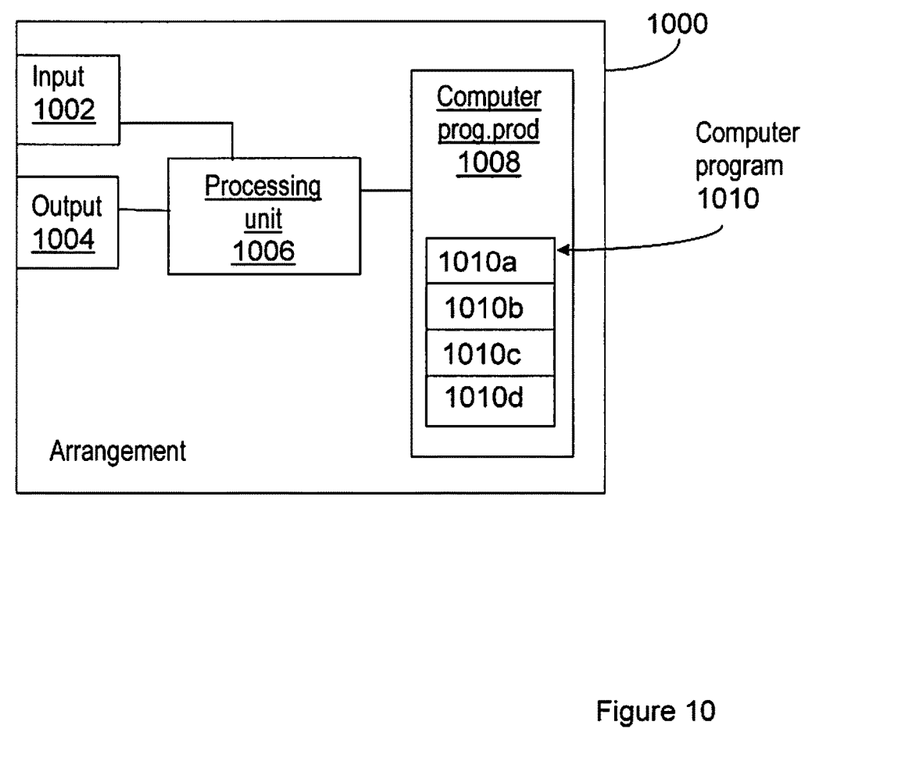

Exemplifying Arrangement, FIG. 10

FIG. 10 schematically shows a possible embodiment of an arrangement 1000, which also can be an alternative way of disclosing an embodiment of the arrangement in the network node 901 illustrated in FIG. 9. Comprised in the arrangement 1000 are here a processing unit 1006, e.g. with a DSP (Digital Signal Processor). The processing unit 1006 may be a single unit or a plurality of units to perform different actions of procedures described herein. The arrangement 1000 may also comprise an input unit 1002 for receiving signals from other entities or nodes, and an output unit 1004 for providing signals to other entities or nodes. The input unit 1002 and the output unit 1004 may be arranged as an integrated entity.

Furthermore, the arrangement 1000 comprises at least one computer program product 1008 in the form of a non-volatile memory, e.g. an EEPROM (Electrically Erasable Programmable Read-Only Memory), a flash memory and a hard drive. The computer program product 1008 comprises a computer program 1010, which comprises code means, which when executed in the processing unit 1006 in the arrangement 1000 causes the arrangement and/or a node in which the arrangement is comprised to perform the actions e.g. of the procedure described earlier in conjunction with FIGS. 7-8.

The computer program 1010 may be configured as a computer program code structured in computer program modules. Hence, in an exemplifying embodiment, the code means in the computer program 1010 of the arrangement 1000 may comprise an obtaining module 1010*a* for obtaining a request for a bearer setup or an indication thereof. The arrangement 1000 may further comprise a determining module 1010*b* for determining or deciding whether to accept or reject the request based on information on current bearers.

The computer program may further comprise a control module 1010*c* for accepting or rejecting the request. The computer program 1010 may further comprise one or more additional modules 1010*d* for providing e.g. scheduling functions.

The modules 1010*a-d* could essentially perform the actions of the flows illustrated in FIGS. 7-8, to emulate the arrangement in the network node illustrated in FIG. 9.

Although the code means in the embodiment disclosed above in conjunction with FIG. 10 are implemented as computer program modules which when executed in the processing unit causes the decoder to perform the actions described above in the conjunction with figures mentioned above, at least one of the code means may in alternative embodiments be implemented at least partly as hardware circuits.

A previously mentioned, the processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

While the method and network node or arrangement for admission control as suggested above has been described with reference to specific embodiments provided as examples, the description is generally only intended to illustrate the suggested technology and should not be taken as limiting the scope of the suggested methods and arrangements, which are defined by the appended claims. While described in general terms, the method and arrangement may be applicable e.g. for different types of communication systems applying shared channels for communication.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions. It should also be noted that the units or modules described in this disclosure are to be regarded as logical entities and not with necessity as separate physical entities.

ABBREVIATIONS

CCE Control Channel Elements
DBS Delay Based Scheduling
EPS Evolved Packet System
E-RAB Evolved Radio Access Bearer
EUTRAN Evolved UMTS Terrestrial Radio Access Network
FTP File Transfer Protocol
GBR Guaranteed Bit Rate
LTE Long Term Evolution
MSR Monitored System Resource
PDCCH Physical Downlink Control Channel
PDSCH Physical Downlink Shared Channel
PUSCH Physical Uplink Shared Channel
PRB Physical Resource Block
QoS Quality of Service
RAB Radio Access Bearer
TCP Transmission Control Protocol
TTI Transmission Time Interval
UMTS Universal Mobile Telecommunications System
VoIP Voice over Internet Protocol

The invention claimed is:

1. A method for admission control in a network node, the method comprising:
    scheduling transmissions for a plurality of bearers, the plurality of bearers comprising:
        a first set of current bearers that are not at risk of resource starvation, the first set of current bearers carrying first data that either has no QoS value or for which the transmissions do not fulfill a criterion representing a probability of violating a QoS value associated with the first data; and
        a second set of current bearers that are at risk of resource starvation, the second set of current bearers carrying second data for which the transmissions fulfill a criterion representing a probability of violating a QoS value associated with the second data;
    receiving a request for a bearer setup;
    deciding whether to accept or reject the request for the bearer setup depending on whether the network node is experiencing high resource usage that is caused by congestion, wherein:
        the decision to accept the request for the bearer setup is based on disregarding information associated with the first set of current bearers and determining that information associated with the second set of current bearers indicates that accepting the request for the bearer setup would not cause a congestion threshold to be exceeded; and
        the decision to reject the request for the bearer setup is based on disregarding the information associated with the first set of current bearers and determining that the information associated with the second set of current bearers indicates that accepting the request for the bearer setup would cause the congestion threshold to be exceeded;
    wherein the disregarding of the information associated with the first set of current bearers, which are not at risk of resource starvation, prevents an unnecessary rejection of the request for the bearer setup.

2. The method according to claim 1, wherein the information is related to resource usage of the bearers.

3. The method according to claim 1, wherein the criterion relates to at least one of:
    a packet delay;
    a bit rate;
    a function of a packet delay and/or a bit rate;
    a scheduling priority or weight.

4. The method according to claim 1, wherein the criterion relates to a scheduling priority or weight, set by a scheduler.

5. Method according to claim 4, wherein the scheduling priority or weight is set as a function of a probability of violating the QoS value.

6. The method according to claim 1, further comprising: indicating the outcome of the deciding to the requesting node.

7. A network node operable to perform admission control, the network node comprising:
    a scheduler adapted to schedule transmissions for a plurality of bearers, the plurality of bearers comprising:
        a first set of current bearers that are not at risk of resource starvation, the first set of current bearers carrying first data that either has no QoS value or for which the transmissions do not fulfill a criterion representing a probability of violating a QoS value associated with the first data; and
        a second set of current bearers that are at risk of resource starvation, the second set of current bearers carrying second data for which the transmissions fulfill a criterion representing a probability of violating a QoS value associated with the second data;
    a receiver adapted to receive a request for bearer setup; and
    an admission controller adapted to decide whether to accept or reject the request for the bearer setup depending on whether the network node is experiencing high resource usage that is caused by congestion, wherein:
        the decision to accept the request for the bearer setup is based on disregarding information associated with the first set of current bearers and determining that information associated with the second set of current bearers indicates that accepting the request for the bearer setup would not cause a congestion threshold to be exceeded; and
        the decision to reject the request for the bearer setup is based on disregarding the information associated with the first set of current bearers and determining that the information associated with the second set of current bearers indicates that accepting the request for the bearer setup would cause the congestion threshold to be exceeded;
    wherein the disregarding of the information associated with the first set of current bearers, which are not at risk of resource starvation, prevents an unnecessary rejection of the request for the bearer setup.

8. The network node of claim 7, wherein the information is related to resource usage of the bearers.

9. The network node of claim 7, wherein the criterion relates to at least one of:
    a packet delay;
    a bit rate;
    a function of a packet delay and/or a bit rate;
    a scheduling priority or weight.

10. The network node of claim 7, wherein the criterion relates to a scheduling priority or weight, set by the scheduler.

11. Network node according to claim 10, wherein the scheduling priority or weight is set as a function of a probability of violating the QoS value.

12. The network node of claim 7, wherein the admission controller is further adapted to indicate the outcome of the deciding to the requesting node.

* * * * *